(12) United States Patent
Pham et al.

(10) Patent No.: US 7,940,278 B2
(45) Date of Patent: May 10, 2011

(54) METHOD AND SYSTEM FOR PROGRAMMING FOR IMAGE ENHANCEMENT

(75) Inventors: Hung Manh Pham, Torrance, CA (US); Chi Minh Pham, Lawndale, CA (US)

(73) Assignee: Xerox Corporation, Norwalk, CT (US)

( * ) Notice: Subject to any disclaimer, the term of this patent is extended or adjusted under 35 U.S.C. 154(b) by 1416 days.

(21) Appl. No.: 11/296,416

(22) Filed: Dec. 8, 2005

(65) Prior Publication Data

US 2007/0133053 A1 Jun. 14, 2007

(51) Int. Cl.
*G09G 5/36* (2006.01)
*G06F 12/02* (2006.01)
*G06F 12/06* (2006.01)
*G06K 9/00* (2006.01)
*G06K 9/56* (2006.01)

(52) U.S. Cl. ........ 345/556; 382/165; 382/205; 345/565; 345/572

(58) Field of Classification Search ........................ None
See application file for complete search history.

(56) References Cited

U.S. PATENT DOCUMENTS

2002/0033956 A1 * 3/2002 Koga .............................. 358/1.9

* cited by examiner

*Primary Examiner* — Kee M Tung
*Assistant Examiner* — Carlos Perromat
(74) *Attorney, Agent, or Firm* — MH2 Technology Law Group LLP

(57) ABSTRACT

In a method of programming for image enhancement, a content addressable memory is accessed. At least one template is transferred into the content addressable memory. A random access memory is accessed. Enhancement data is transferred into the random access memory. Video data input is inputted into the content addressable memory. Enhancement data is outputted from the random access memory based on the video data matching at least one template.

13 Claims, 5 Drawing Sheets

METHOD AND SYSTEM FOR PROGRAMMING FOR IMAGE ENHANCEMENT

FIELD

This invention generally relates to imaging. More particularly, the invention relates to a method and system for a reprogrammable architecture for image enhancement.

DESCRIPTION OF THE RELATED ART

A wide variety of digital document processing tasks are performed using template-based filters. Digital document processing tasks may include resolution conversion, enhancement, restoration, appearance tuning and descreening of images. For example, resolution conversion and appearance matching from 240, 300, 600 spots per inch (spi) to 600×2400 outputs. These tasks are commonly performed on monochrome and color images, as well as binary and continuous tone images. A continuous tone image may also be referred to as a grayscale image.

In conventional systems and methods, a typical filter includes template operators to perform processing of the images. That is, a filter may be characterized as an operator or device that transforms one image into another image. The filter is formed of a number of imaging template operators or templates. These templates may be, for example, stored in a look-up table. The number of templates in a filter may vary between a small set to thousands of templates. Accordingly, a look-up table is typically used to implement a filter as an application specific integrated circuit (ASIC), field programmable gate array (FPGA) or other similar technology.

A raster is a one-dimensional array of image data, reflecting a single line of data across a single dimension, i.e., the length or the width, of the image. Further, each location in an image may be called a pixel. In an array defining an image in which each item of data provides a value, each value indicating the properties of a location may be called a pixel value. Each pixel value is a bit in a binary form of an image, a grayscale value in a grayscale form of an image, or a set of color spaced coordinates in a color coordinate form of an image. The binary form, grayscale form, and color coordinate form are each arranged in a two-dimensional array, which defines an image.

The filter, using the templates, transforms certain observed pixel patterns in a binary image, for example, into a corresponding enhanced binary pixel pattern, for example. Specifically, the filter observes an arrangement of pixels using a suitable window or mask. A window is an imaging component that observes a plurality of pixels at the same time and inputs properties of the observed pixels. After observing the arrangement of pixels, the filter then attempts to match the observed pixel pattern with one of the templates in the look-up table. If the look-up table contains a match to the observed pixel pattern, the look-up table generates an appropriate output. The output may be an enhanced pixel pattern that corresponds to the observed pixel pattern.

A wide variety of types and sizes of observation windows or masks are known. The particular window used in a particular application depends on the image to be analyzed and the particular process to be performed on the image. Illustratively, a 3×3 window may be used to process an image. The 3×3 window, at various locations in the image, observes a 3×3 block, i.e., a 9-pixel block, of binary-valued pixels, for example. One pixel in the window is the target pixel, which is typically the center pixel, while the other pixels in the window are the neighboring pixels. The target pixel and the neighboring pixels result in a neighborhood. The window is typically scanned across an image advancing from target pixel to target pixel.

After the neighborhood is observed in the window, the neighborhood is then processed in some manner. For example, the observed neighborhood may be transformed into a vector. The vector is expressed in the form of $(A_1, A_2, \ldots A_n)$ and is used to represent the properties of the target pixel, including the neighborhood of the target pixel. Each element of the vector represents one of the pixels observed in the window. The vector is then used in the look-up table to generate a desired output, for example.

Since these templates are typically hardcoded into silicon, the filters in silicon have disadvantages and drawbacks. For instance, a template update for an existing ASIC design would require a new ASIC to be designed. More particularly, if the observation window were to increase from 3×3 to a 5×5 window, new ASIC would have to be designed. The existing ASICs would then be replaced by the new ASIC. As another example, if the templates were to be updated, the existing ASICs would have to be replaced because the templates are hardcoded into silicon. Accordingly, the design and replacement of ASIC may increase the cost of the overall system as well affect the development cycle of the overall system.

SUMMARY

One embodiment pertains to a method of programming for image enhancement. The method includes accessing a content addressable memory and transferring at least one template into the content addressable memory. The method also includes accessing a random access memory and transferring enhancement data into the random access memory. The method further includes inputting video data into the content addressable memory and outputting enhancement data based on the video data matching at least one template.

Another embodiment relates to a system for a programmable template system. The system includes a content addressable memory (CAM) configured to be addressed by data and outputting at least one address and a priority logic configured to interface with the CAM and to resolve a plurality of received addresses to a priority address. The system also includes a random access memory (RAM) configured to receive the priority address and output respective enhancement data stored at the received priority address.

Yet another embodiment is generally associated with an apparatus for a programmable template system. The apparatus includes a plurality of template cores. Each template core includes a content addressable memory (CAM) configured to be addressed by data and outputting at least one address and a priority logic configured to interface with the CAM and to resolve a plurality of received addresses to a priority address. The template core also includes a random access memory (RAM) configured to receive the priority address and output respective enhancement data stored at the received priority address, where each template core receives respective data from a data source.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of document processing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a method, system and apparatus for programmable templates architecture. More particularly, a programmable template system includes a content addressable memory (CAM), a priority logic, and a random access memory (RAM). The CAM may be configured to receive video input with neighborhood bits and to generate an address. In some instances, the same video input may generate multiple hits in the CAM. The priority logic may be configured to resolve these instances. Accordingly, the priority logic may select the highest outputted address in the event of multiple hits from the CAM. The RAM may be configured to store enhancement data. The outputted address from the priority logic is used as an address into the RAM. At the addressed location, the RAM may store the enhanced data for the video input. The RAM may then output the enhanced data. Since the CAM and RAM may be addressed and written thereto, the programmable template system may be refreshed with new templates at any time.

Figure 1:
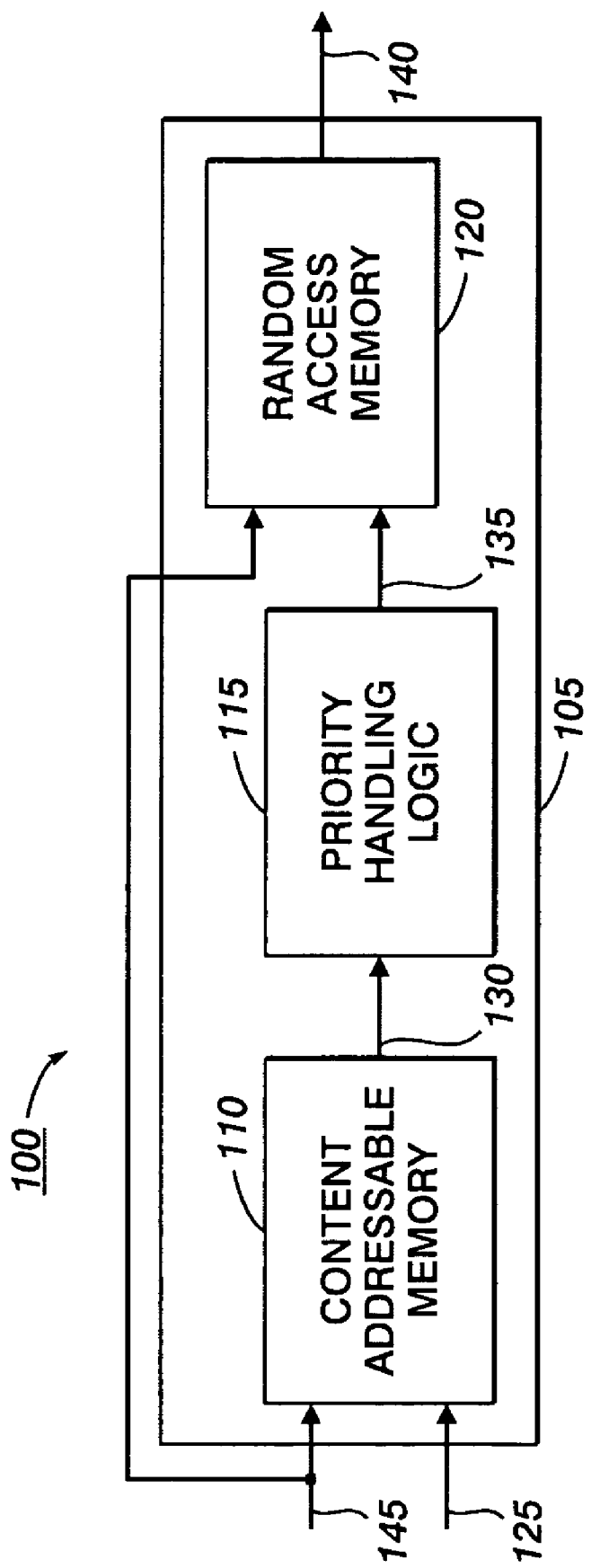
FIG. 1 illustrates an exemplary block diagram of a system in accordance with an embodiment of the invention.

FIG. 1 illustrates a block diagram of a programmable template system 100 in accordance with an embodiment. It should be readily apparent to those of ordinary skill in the art that the system 100 depicted in FIG. 1 represents a generalized schematic illustration and that other components may be added or existing components may be removed or modified. Moreover, the components may be implemented in hardware, software or combinations thereof.

As shown in FIG. 1, the programmable template system 100 may include a programmable template core 105. The programmable template core 105 may include a content addressable memory (CAM) 110, a priority handling logic 115, and a random access memory (RAM) 120.

The CAM 110 may be configured to function as an associative array. More particularly, the CAM 110 may receive a data word over the input bus 125 and the CAM 110 may search its entire memory to see if that data word is stored anywhere in it. If the data word is found, the CAM 110 returns a list of one or more storage addresses where the data word was found. The one or more storage addresses may then be outputted to the CAM output 130.

The CAM 110 may be configured to interface with the priority handling logic 115 through the CAM output 130, which may be implemented as a bus or other similar communication channel. The priority handling logic 115 may be configured to determine the highest priority address in the event that an inputted data word generates multiple addresses. In some embodiments, the priority level may rise with the address number. In other words, address 2000 in a 2000-word CAM would have the highest priority and address 0001 has the lowest priority. In other embodiments, the priority may have an inverse relation to the address. More particularly, address 2000 would have the lowest priority and address 0001 has the highest priority in a 2000-word CAM. The priority handling logic 115 may be implemented using discrete components, ASICs, or FPGAs.

The programming template core 105 may further include a local bus 145. The local bus 145 may be configured to provide a communication channel for the CAM 110 and the random access memory 120. More particularly, a user may use the local 145 to load or reprogram the programming template core 145.

The priority handling logic 115 may output a high priority address on the logic output 135, which is then interfaced to the random access memory 120. The random access memory 120 may be configured to receive the selected address from the priority handling logic 115. The random access memory 120 may then use the selected address to output the data stored at the selected address. In some embodiments, the data stored in the random access memory 120 may be enhancement data. Enhancement data may be Grey-bit data associated with the selected template.

In some embodiments, the programming template core 105 may be configured to store templates used for pixel manipulation, resolution conversion, font improvement. In these cases, the CAM 110 may be configured to store templates and the RAM 120 to store enhancement data. Moreover, since the CAM 110 is a type of non-persistent memory, templates of different sizes may be stored in the CAM 110. Similarly, the RAM 120 may store different sizes of enhancement data as well as different types of data. For example, data associated with 5×5 templates may be initially loaded and then data associated with 7×7 templates may then be loaded during a software update. The programmable template core 105 may also offer the flexibility of using a variety of template sizes at initial design while using the same architecture. Thus, the programmable template core 105 may reduce lifecycle cost and design costs.

Figure 2:
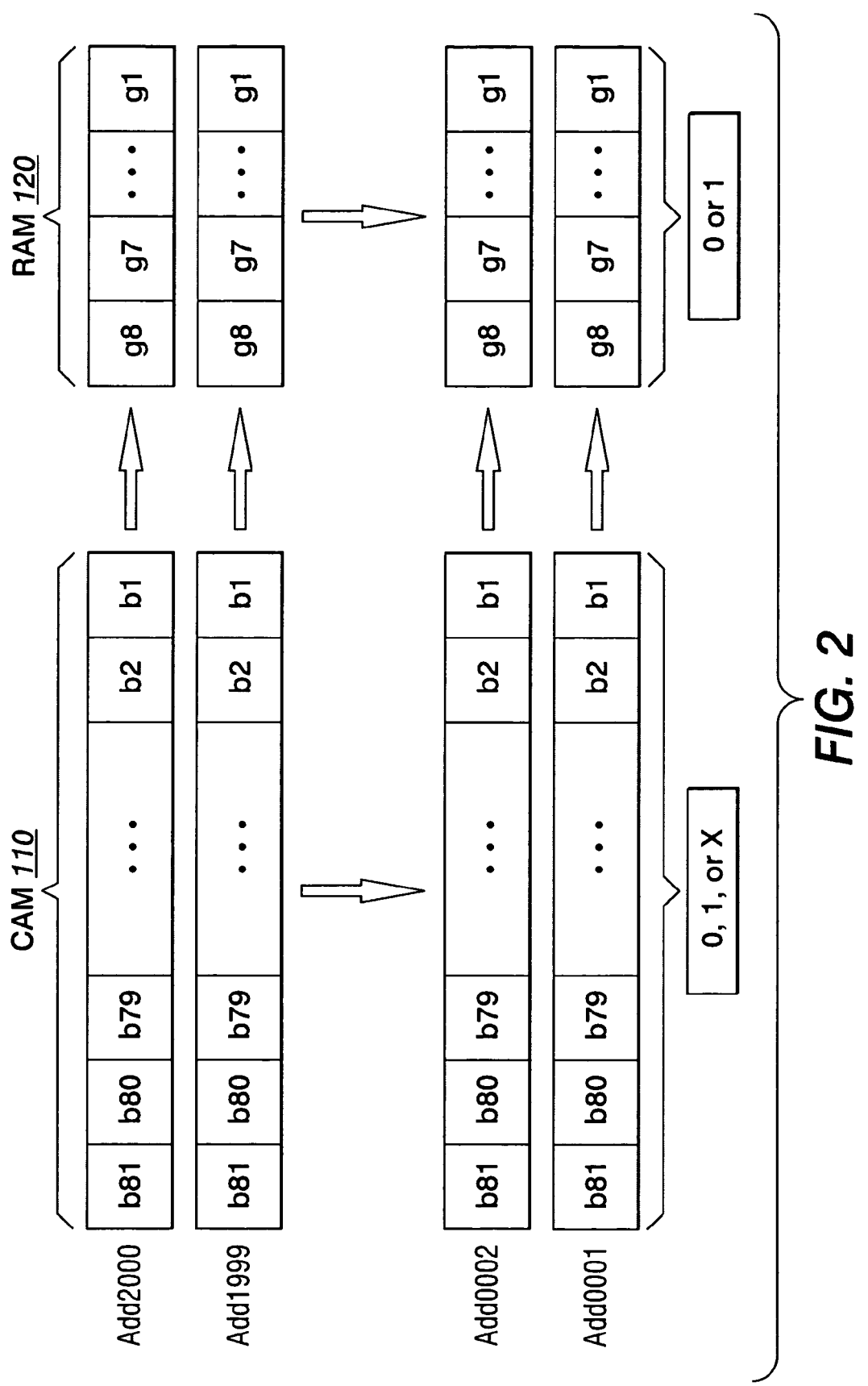
FIG. 2 illustrates a memory diagram of the system illustrated in FIG. 1, in accordance with another embodiment of the invention.

In some embodiments, the programmable template core 105 may be configured to operate in two modes. One mode may be considered a write mode. More particularly, the write mode may involve writing a template sets into the CAM 110 and the random access memory 120. FIG. 2 illustrates the storage of template set for 9×9-neighborhood with 8 Grey bit enhancement data.

As shown in FIG. 2, CAM 110 and the random access memory 120 may contain 2000 storage locations, respectively. The CAM 110 may be configured to store 2000 9×9 templates and the random access memory 120 may be configured to store 2000 8 bit enhancement data. Accordingly, the size of the CAM 110 is 2000×81 and the size of the random access memory 120 is 2000×8. In other embodiments, the size of the CAM 110 and random access memory 120 may vary as required.

For this embodiment, the highest priority template is stored in the highest address, e.g., address 2000 (labeled as ADR2000 in FIG. 2) contains the highest priority template. Each bit in the CAM 110 may store three states: one, zero or X (a don't care). Each bit in the random access memory 120 may store two states: one or zero.

During a write mode, a local microprocessor (not shown) may access the local bus 145. The local microprocessor may communicate the appropriate bus signals to prepare for a write to the CAM 110 and random access memory 120. The local microprocessor may then transfer the template set to the programming template core 105.

The second mode of the programming template core 105 may be considered a real-time video mode. An example of the real-time video mode for a two-match scenario is depicted in FIG. 3.

Figure 3:
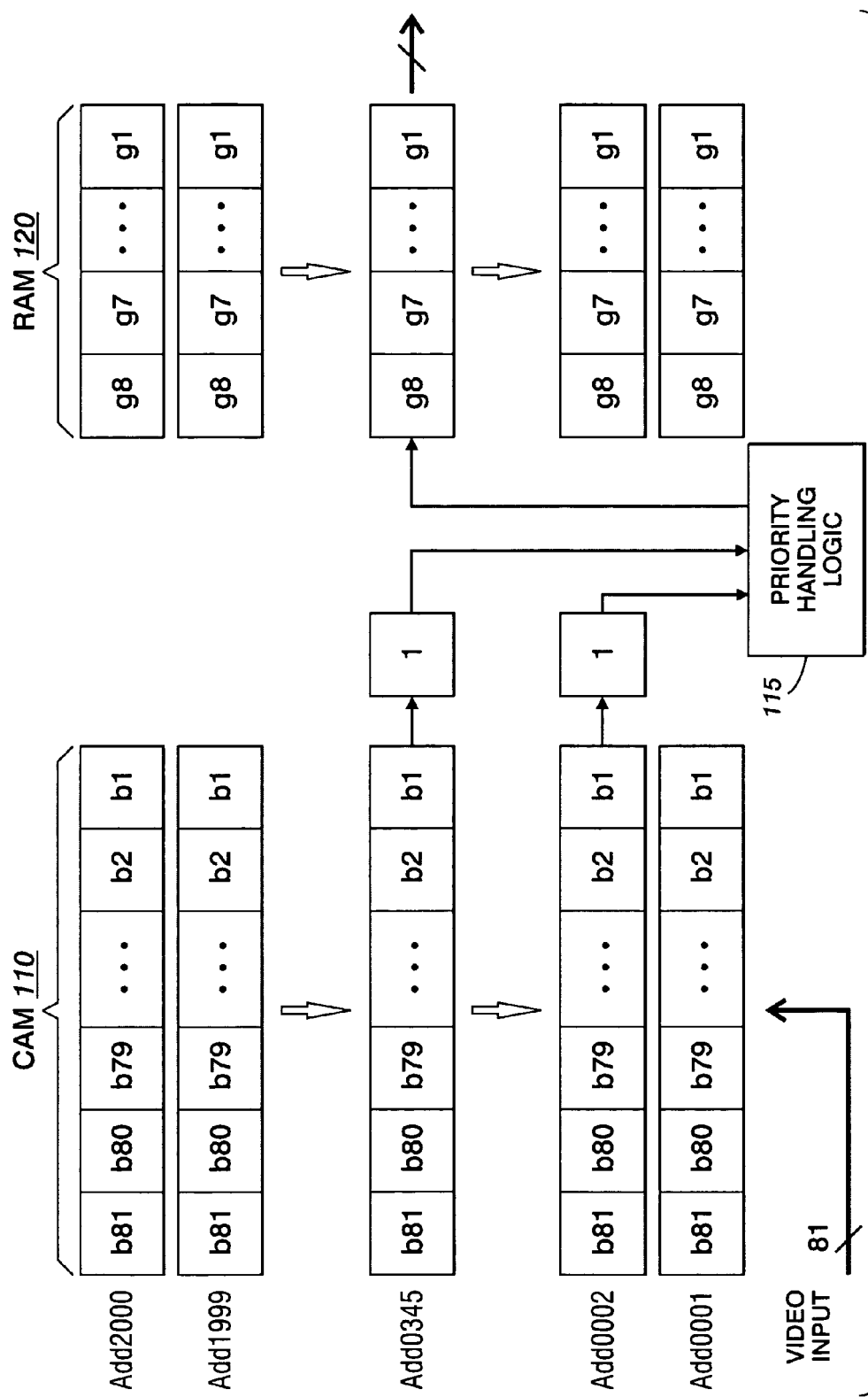
FIG. 3 illustrates a memory diagram of the system illustrated in FIG. 1, in accordance with another embodiment of the invention.

As shown in FIG. 3, the CAM 110 may store a template set for a 9×9 neighborhood with associated 8 Grey bit enhancement data stored in the random access memory 120. An incoming data word may be placed on the video input 125. The CAM 110 may be configured to output two matches, Add0345 and Add0002, based on the incoming data word to the priority handing logic 115.

In this example, the priority handling logic 115 may be configured to select the higher priority address, i.e., the higher address to be used as input to the random access memory 120. Other embodiments may use a round-robin priority scheme, an inverse priority scheme or other types of priority schemes. The random access memory 120 may then use the received address to address a location in therein. The 8-Grey bit value stored at the location may then be outputted as the video output. The processing time may be accomplished within two clocks: one clock for CAM 110 matching with built-in priority decoding and one clock for synchronous random access memory 120 access. In other embodiments, processing time may be accomplished within one clock using asynchronous random access memory.

Figure 4:
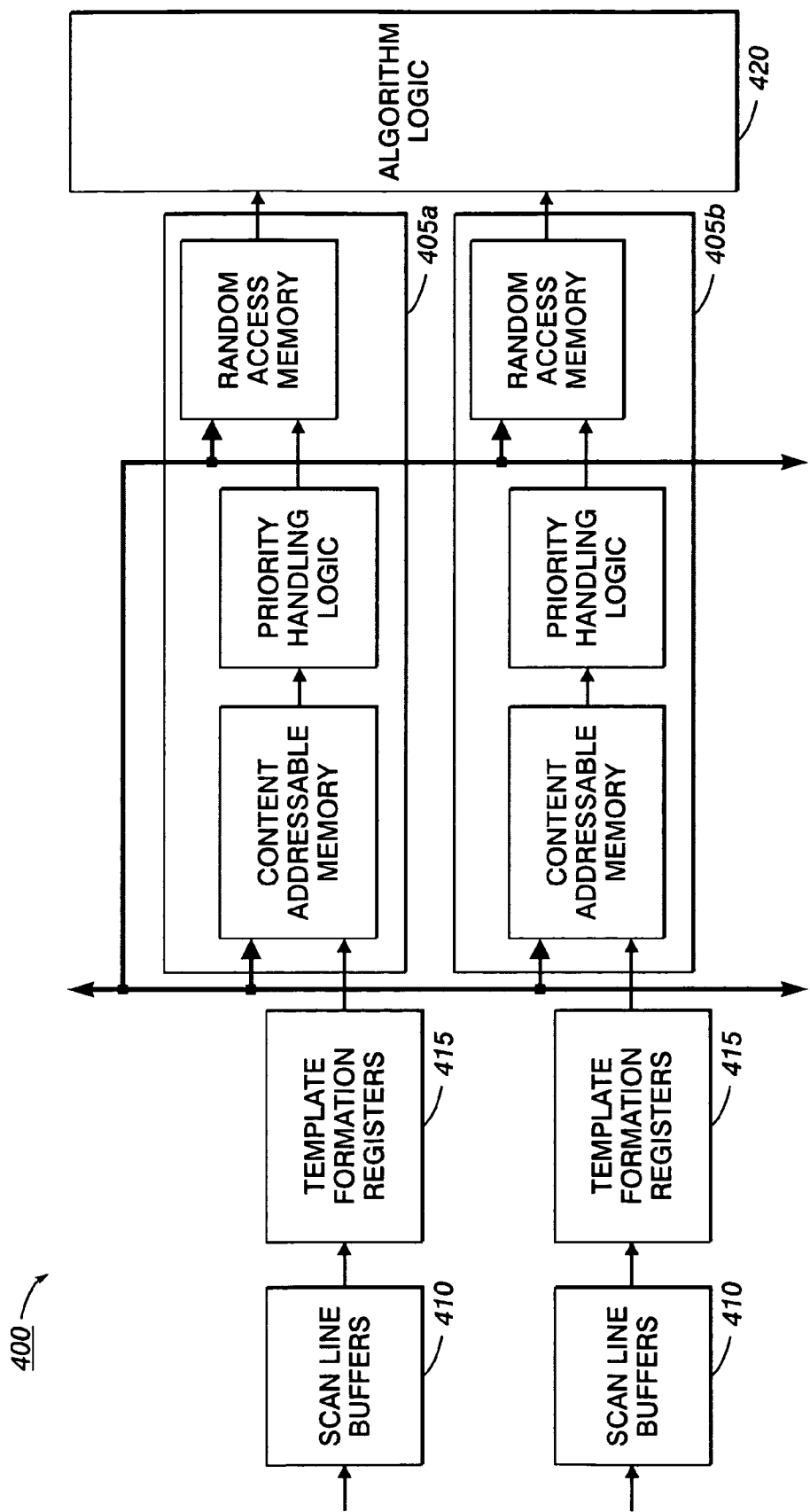
FIG. 4 illustrates another system in accordance with yet another embodiment.

FIG. 4 illustrates programmable template system 400 with two template programming cores. It should be readily apparent to those of ordinary skill in the art that the system 400 depicted in FIG. 4 represents a generalized schematic illustration and that other components may be added or existing components may be removed or modified. Moreover, the components may be implemented in hardware, software or combinations thereof.

As shown in FIG. 4, the programmable template system 400 may include two programmable template cores 405ab. A scan line buffer 410 may be interfaced with a template formation register 415, which is then interfaced with the programmable template core 405.

The scan line buffer 410 may be configured to buffer serial scan data from a data source. The scan line buffer 410 may be configured to forward the buffered data to the template formation registers 415, which is configured to output a data word in a format required by the CAM of the programmable template cores 405.

The programmable template cores 405 may process the video data and output the Grey Bits and/or the "match" information to the algorithm logic 420. The algorithm logic 420 may be configured to determine the logical interaction between outputs of the programmable template cores and produces the video outputs to imager devices.

Figure 5:
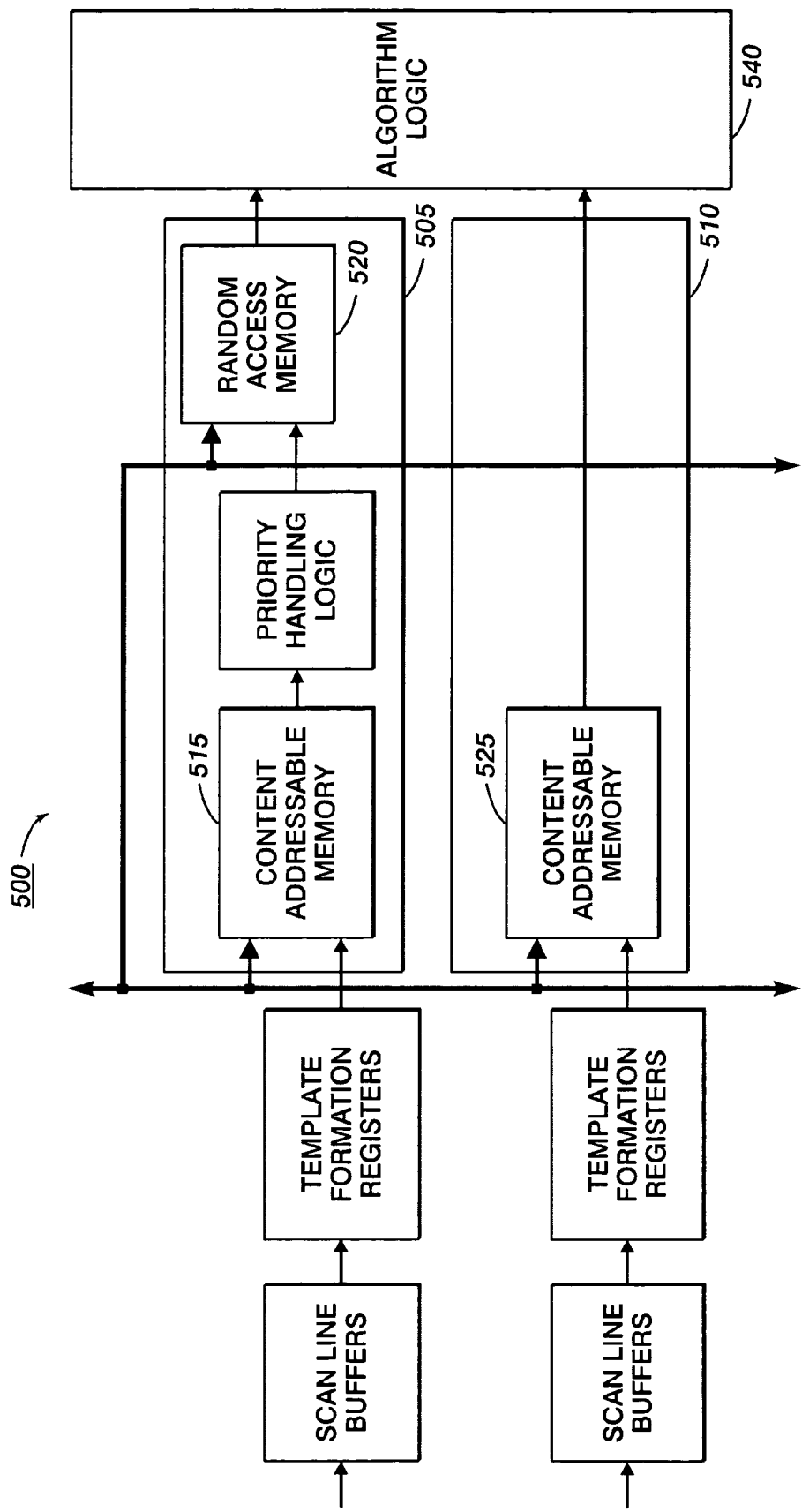
FIG. 5 illustrates yet another exemplary system diagram in accordance with yet another embodiment.

FIG. 5 illustrates a programmable template system 500 that converts 600×600 spi to 600×2400 spi. It should be readily apparent to those of ordinary skill in the art that the system 500 depicted in FIG. 5 represents a generalized schematic illustration and that other components may be added or existing components may be removed or modified. Moreover, the components may be implemented in hardware, software or combinations thereof.

As shown in FIG. 5, the system 500 may include programmable template core 505 and programmable template core 510. The system 500 may also include two template sets: a 5×5 template set and a 7×7 border template set. The 5×5 template set may be stored in programmable template core 505, where programmable template core 505 may process the main line video processing. The 7×7 border template set may be stored in programmable template core 510, where the core 510 may be configured to recognize half-tone screen to avoid artifacts produced by the 5×5 template set.

Programming template core 505 may include a CAM 515 and a RAM 520, each respectively configured to store the data associated with 2000 templates. The CAM 515 may have a data size of 25 bits and the RAM 520 may have a data size of 4 bits.

Programming template core 510 may include a CAM 525 that has a data size of 24-bits. A border of 7×7 has 24-bits. Programming template core 510 may be configured without a priority handling logic and a RAM.

In a write mode, a local microprocessor (not shown) may be configured to load the 5×5 template set and associated data to the CAM 515 and RAM 520, respectively, of programmable template core 505 as well as the 7×7 template set into CAM 525. In a real-time video mode, data may be buffered by scan line buffers 530 and template formation registers 530 to form 5×5 and 7×7 templates. The 5×5 templates are inputted to the programmable template core 505. Programmable template core 505 may then search and output the enhanced Grey bits to algorithm logic 540. The 7×7 template may be inputted to the programmable template core 510, which will search its CAM 525 and output match information to the algorithm logic 540. Subsequently, the algorithm logic will output enhanced data from programmable template core 505 and output unenhanced video when programmable template core 510 finds a match, i.e., a half tone screen is detected.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of programming for image enhancement, the method comprising:
   receiving a first data word into a first content addressable memory (CAM) storing at least one first image template;
   receiving a second data word into a second CAM storing at least one second image template;
   determining a first address of the first CAM storing a first image template of the at least one first image template that matches the first data word;
   determining a second address of the second CAM storing a second image template of the at least one second image template that matches the second data word;
   accessing a random access memory (RAM) to identify image enhancement data for the first data word stored at the first address of the RAM;

outputting, from the RAM to a logic block, the image enhancement data for the first data word; and outputting, from the second CAM to the logic block, an indication that the second image template matches the second data word.

2. The method of claim 1, further comprising:

determining at least two addresses of the first content addressable memory (CAM) storing the first image template of the at least one first image template that matches the first data word; and inputting the at least two addresses to a priority logic.

3. The method of claim 2, further comprising resolving a priority address in response to the priority logic receiving the at least two addresses from the first content addressable memory.

4. The method of claim 3, further comprising inputting the priority address to the random access memory (RAM) to identify the image enhancement data.

5. The method of claim 1, wherein the first data word comprises video data and wherein the method further comprises selecting a bit width of the first content addressable memory (CAM) based on the video data.

6. The method of claim 1, further comprising selecting a bit width of the random access memory (RAM) based on a size of the image enhancement data.

7. A system for a programmable template system, the system comprising:

a first content addressable memory (CAM) configured to store a plurality of first image templates, receive a first data word, and determine at least one first address storing a first image template of the plurality of first image templates that matches the first data word;

a priority logic configured to interface with the first CAM, receive the at least one first address, and determine a priority address of the at least one first address;

a second CAM configured to store a plurality of second image templates, receive a second data word, determine a second address storing a second image template of the plurality of second image templates that matches the second data word, and output to a logic block an indication that the second image template matches the second data word; and a random access memory (RAM) configured to receive the priority address and output to the logic block respective image enhancement data for the first data word stored at the priority address.

8. The system of claim 7, wherein a bit width of the first CAM is based on a size of the first data word.

9. The system of claim 7, wherein a bit width of the RAM is based on a size of the image enhancement data.

10. The system of claim 7, wherein the first CAM comprises an interface to a bus.

11. The system of claim 10, wherein the first CAM is configured to receive a signal through the interface to clear the plurality of first image templates from the CAM and receive new image templates for storage in the first CAM.

12. The system of claim 7, wherein the RAM comprises an interface to a bus.

13. The system of claim 12, wherein the RAM is configured to receive a signal through the interface to clear the image enhancement data from the RAM and receive new image enhancement data to be written to the RAM.

* * * * *